(12) United States Patent
Cross et al.

(10) Patent No.: US 6,246,963 B1
(45) Date of Patent: Jun. 12, 2001

(54) METHOD FOR PREDICTING STRATIGRAPHY

(76) Inventors: Timothy A. Cross, 4996 Bear Mountain Dr., Evergreen, CO (US) 80439; Margaret A. Lessenger, 17226 Rimrock Dr., Golden, CO (US) 80401

( * ) Notice: Subject to any disclaimer, the term of this patent is extended or adjusted under 35 U.S.C. 154(b) by 0 days.

(21) Appl. No.: 09/239,634

(22) Filed: Jan. 29, 1999

(51) Int. Cl.$^7$ ............................................. G01V 1/28
(52) U.S. Cl. ..................................................... 702/14
(58) Field of Search ............................ 702/14, 6, 7, 8, 702/10–13, 16, 18; 367/73, 72

(56) References Cited

U.S. PATENT DOCUMENTS

| | | | |
|---|---|---|---|
| 4,679,174 | | 7/1987 | Gelfand .................................. 367/73 |
| 4,926,394 | | 5/1990 | Doyen .................................... 367/73 |
| 4,953,142 | | 8/1990 | Rimmer .................................. 367/73 |
| 4,964,099 | | 10/1990 | Carron .................................... 367/73 |
| 4,972,383 | | 11/1990 | Lailly ...................................... 367/73 |
| 5,210,691 | * | 5/1993 | Freedman et al. ....................... 702/7 |
| 5,570,321 | | 10/1996 | Bernitsas ................................ 367/38 |
| 5,583,825 | * | 12/1996 | Carrazzone et al. ................... 367/31 |
| 5,675,147 | * | 10/1997 | Ekstrom et al. ..................... 250/256 |
| 5,704,713 | * | 1/1998 | Kim et al. ............................ 374/136 |
| 5,798,982 | * | 8/1998 | He et al. ................................ 367/73 |
| 5,835,883 | * | 11/1998 | Neff et al. ............................... 702/7 |
| 5,889,729 | * | 3/1999 | Frenkel et al. ......................... 367/73 |

OTHER PUBLICATIONS

M.A. Lessinger and T.A. Cross, An Inverse Stratigraphic Simulation Model—Is Stratigraphic Inversion Possible? *Energy Exploration & Exploitation* 14:627–637, 1996.

* cited by examiner

*Primary Examiner*—Donald E. McElheny, Jr.

(57) ABSTRACT

The present relates generally to the field of quantitative sedimentologic and stratigraphic prediction in which errors, uncertainties, risk and accuracy are calculated. Specifically, geologic data observed or inferred from core, outcrop, well log and/or seismic data from particular locations, in conjunction with a stratigraphic forward model and an optimization technique (mathematical inverse algorithm), are used to predict stratigraphic and sedimentologic attributes at locations other than those at which data were collected. This is accomplished by inverting a stratigraphic/sedimentologic forward model with simultaneous multi-parameter inversion or other mathematical optimization technique, such that forward model predictions are forced to obtain a best match with observations. The geologic data used to constrain the inversion are a small sample set of the larger, complete, rock volume simulated by the model.

5 Claims, 5 Drawing Sheets

(1 of 5 Drawing Sheet(s) Filed in Color)

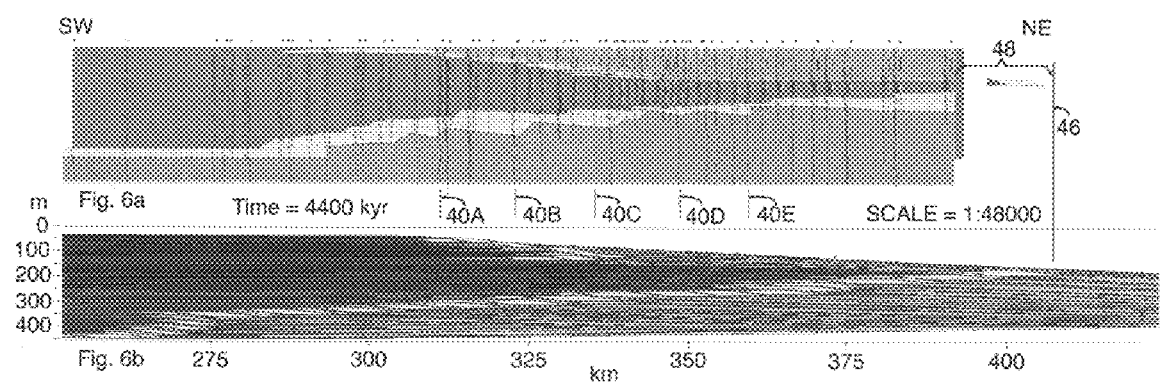

METHOD FOR PREDICTING STRATIGRAPHY

FIELD OF INVENTION

The invention relates generally to the field of quantitative sedimentologic and stratigraphic prediction.

BACKGROUND OF THE INVENTION

Sedimentology is the study of sedimentary rocks that are formed by: (1) the deposition of rock fragments which have been transported from their source to another location by water or air (sandstone and shale); (2) precipitation from a liquid or solution (salt, gypsum); and (3) remains (shells, skeletons and organic matter) of organisms (limestone, coal). Sedimentary rocks are deposited in layers known as strata. Stratigraphy is the study of the origin, composition, distribution and succession of these strata.

Oil and gas reservoirs occur in sedimentary basins. To recover the petroleum from these reservoirs typically requires drilling through thousands of feet of overlying rock. The drilling of oil and gas wells is normally a very expensive endeavor. Consequently, before incurring this expense, those involved in the exploration for or exploitation of oil and gas reservoirs seek to obtain an understanding of the basin geology and, in particular, the basin sedimentology and stratigraphy so that an oil/gas well is drilled in the location that is likely to achieve the desired result. In the case of oil and gas exploration, geologic and seismic data are used to predict the location of sedimentary rocks and structures that are likely to contain an oil/gas reservoir. With respect to developing an oil/gas reservoir, geologic and seismic data are used to predict locations for drilling wells that will facilitate the extraction of more oil from the reservoir.

Presently, there are many different techniques available for obtaining sedimentologic and stratigraphic data. One technique is seismic surveying, which involves: (1) transmitting sound waves from the surface into the earth; (2) recording the waves that are reflected back to the surface when the transmitted wave encounters interfaces between strata, fractures and the like in the underlying earth; and (3) analyzing the reflected signals to make geological inferences about sedimentary rocks and fluids encountered by the waves as they propagate through the earth. Other techniques that are also used are coring and well logging, which involves taking samples of the various rocks and fluids encountered as a well is drilled, noting the extent of each particular kind of rock that is encountered during the drilling, and inserting various instruments into the well that measure various rock and fluid properties, such as porosity.

Most of the techniques for obtaining sedimentologic and sedimentary data are also relatively expensive and are limited to the locations in which the data are taken, i.e. the data obtained by one of these techniques at a particular location are not representative of the underlying geology for more than a short distance away from the location at which the data were taken. As a consequence, any conclusions drawn with respect to sedimentological and sedimentary attributes are subject to increasing uncertainty as the location of interest becomes increasingly remote from the locations at which the data are taken.

SUMMARY OF THE INVENTION

The invention is directed to the use of geological data from one or more locations to accurately predict the stratigraphy at a remote location, i.e. a location that is distantly located from the location or locations with which the geological data are associated. In one instance, geological data were used to accurately (less the 5% error) predict the stratigraphy 50 kilometers (roughly 30 miles) away from the location at which the geological data were obtained. The ability to accurately predict the stratigraphy is accomplished using a mathematical technique known as inversion. Quantitative stratigraphic predictions made with inversion reduce risks associated with exploration and production and enhance interpretations or predictions made from other data sets. For instance, quantitative prediction of the stratigraphy can be used to: (1) refine what has been inferred about the stratigraphy at the remote location; (2) explain what a particular seismic image means in terms of rock type or other stratigraphic property; or (3) extend with greater confidence information recovered from a well to the volume of rock a significant distance from the well.

In the context of sedimentology and stratigraphy, inversion involves the use of: (1) a forward model to predict stratigraphy throughout a sedimentary basin based upon the values of input parameters; (2) real stratigraphic data from a relatively small number of locations within the sedimentary basin; and (3) an inversion technique that: (a) determines the difference between the real stratigraphic data and the predictions made by the forward model for the locations at which the real stratigraphic data were obtained; and (b) if the difference is unacceptable, modifies the values of the input parameters to the forward model to achieve a closer match between the predicted stratigraphic attributes and the real or observed stratigraphic attributes. The process of using the forward model to predict the stratigraphy throughout the basin and the modification of the values of the input parameters continues until the predictions made by the forward model for the locations associated with the real stratigraphic data match or are reasonably close to the real stratigraphic data. At this point, the forward model has been tuned such that it accurately predicts the stratigraphy not just at the locations associated with the real data but also at other locations in the three dimensional volume that are remotely situated relative to the locations associated with the observed stratigraphic data.

Even though inversion had been applied in a number of geoscience and geoengineering disciplines (including seismic signal processing, well logging, potential field geophysics, petrophysics, hydrology, contaminant transport and oil maturation analysis), it has not been applied to stratigraphic analysis or to prediction of rock attributes beyond and/or between points of control. One principal reason that inversion has not been applied to stratigraphic analysis is that it was regarded as theoretically impossible. Ian Lerche, one of the world's leaders in applying inverse and other optimization techniques to geoscience and geoengineering problems, co-authored an influential paper in 1987 which concluded that the application of inversion and other optimization techniques to the analysis of sedimentary rocks was theoretically impossible (Burton et al., 1987).

The conclusion by Burton et. al. that inversion of stratigraphic data was theoretically impossible was based upon their determination that the different processes involved in producing the stratigraphy of a sedimentary basin and the different parameter values (e.g., magnitudes, rates) associated with these processes can substitute or compensate for each other to produce the stratigraphy in the sedimentary basin of interest. If different combinations of processes can produce the same stratigraphy, then it is impossible to uniquely determine the values of the input parameters of the forward model to accurately predict the stratigraphy over a three dimensional volume of earth. In mathematical terms, this condition is known as nonuniqueness.

In the development of the present invention, it was discovered that the nonuniqueness conclusion reached by Burton et. al. was attributable to two aspects of the forward model that was employed. First, the philosophies incorporated in the forward model reflected stratigraphic paradigms which we now know are not true, including: (1) the assumption that stratigraphic processes substitute for each other to produce identical products; (2) a belief that the stratigraphic record is dominantly composed of the deposits of rare, haphazard events that lack pattern and which are therefore not invertible; and (3) that conservation of mass is not a requirement of the stratigraphic process-response system. Second, the forward model used to test whether inversion could be applied to stratigraphy was a geometric model that did not simulate the process-response system of the real world adequately.

The invention employs a forward model that models the processes associated with creating the stratigraphy in a sedimentary basins. In this regard, conservation of mass is identified as being a key component of the stratigraphic process/response system emulated by the forward model. Further, the types of geological data that have a significant impact on comparing forward model predictions with the observations, i.e., robust types of data, have been identified and incorporated into the forward model. Among the robust data types are: (1) temporal distribution of facies tracts; (2) spatial distributions, volume and geometry of facies tracts; (3) positions and frequency of stratigraphic surfaces of discontinuity; (4) symmetries of stratigraphic cycles; (5) thicknesses, proportions and order of facies successions; (6) number and resolution of correlated cycles; and (7) stratigraphic geometries including aggradations, progradation and the ratios of the two.

The invention also employs an inversion technique that is bounded, i.e., is constrained to establishing parameter values that are reasonable for the stratigraphy that the inversion process is attempting to predict. Among the inversion techniques that are suitable for use in the invention are the genetic, simulated annealing, Monte Carlo techniques and a technique designed by Ian Lerche. Since the inversion technique typically requires a number of cycles (repeatedly running the forward model and modifying the input parameters) before the forward model produces an accurate prediction of the stratigraphy, the speed at which the inversion system operates may be of concern in some applications. Presently, the Lerche inversion technique is believed to be the fastest in this regard.

The invention is also applicable to groundwater hydrology and contaminant transport.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 6A is a stratigraphic cross section showing a distribution of facies tracts based upon well log data; and FIG. 6B is the stratigraphic cross section of facies tracts predicted by the stratigraphic inverse model.

DETAILED DESCRIPTION

Figure 1:
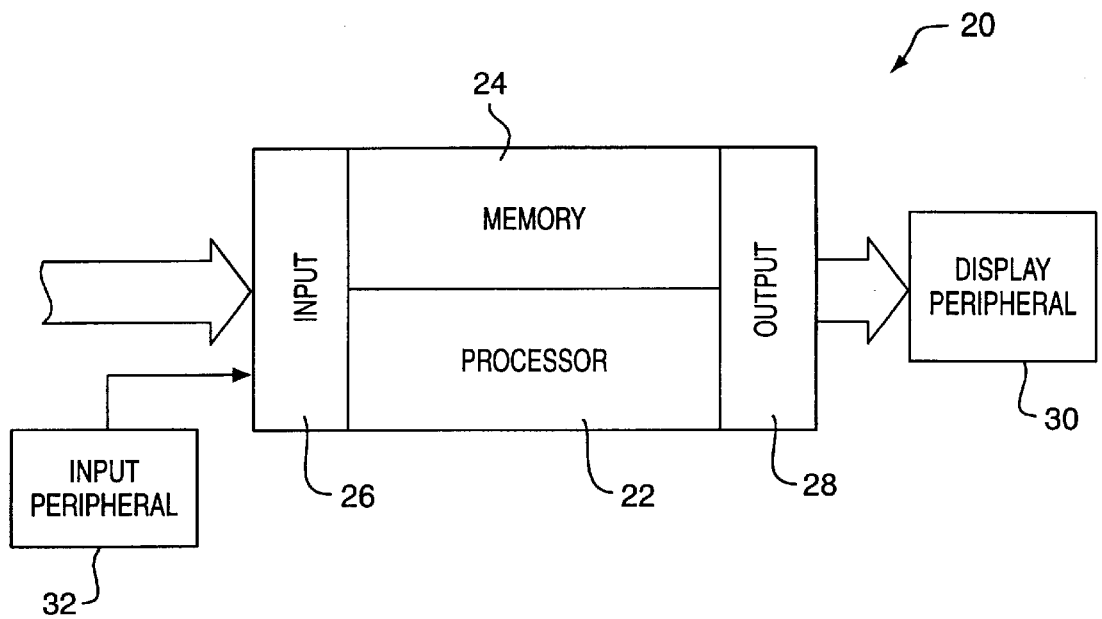
FIG. 1 is a block diagram of a computer system that is used to implement the invention.

The method for predicting stratigraphy, which is hereinafter referred to as the stratigraphic inverse model, is implemented on a computer system that executes an inverse model program. With reference to FIG. 1, a computer system 20 that is suitable for implementing the stratigraphic inverse model includes a processor 22 for executing the stratigraphic inverse model program; a memory 24 for storing the program and data used by the program; an input port 26 for receiving the data that is used by the program; and an output port 28 for transmitting the results produced by the program and information that may be needed for an operator to interact with the program to a display peripheral 30 . The input port 26 may be operatively connected to an input peripheral 32 that permits an operator to specify data that are used by the program or to otherwise interact with the program. The input peripheral 32 can take any number of forms, including a keyboard and/or mouse. The display peripheral 30 is typically either a color monitor or a color printer, because colors are convenient for distinguishing rock types and strata. It should, however, be appreciated that other types of display peripherals are feasible and other means, such as hatching, can be used to distinguish strata from one another.

Figure 2:
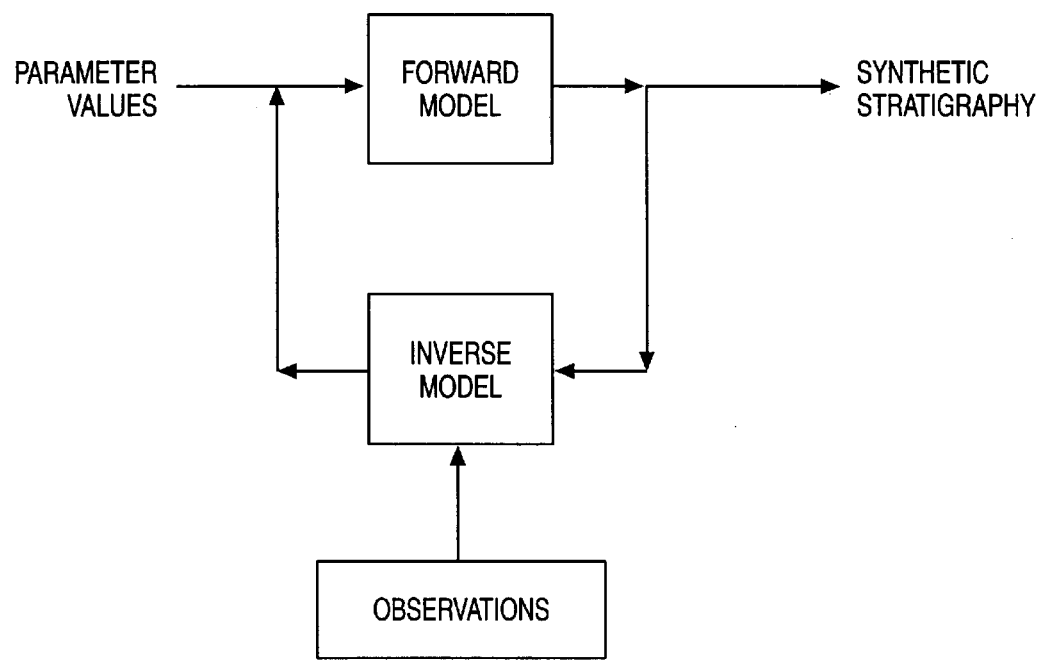
FIG. 2 is a block diagram of the stratigraphic inverse model of the present invention.

With reference to FIG. 2, the stratigraphic inverse model that is implemented in the program has three main components: (1) observations (samples) from a stratigraphic data set; (2) a stratigraphic forward model that uses values of process parameters to make predictions about stratigraphic attributes; and (3) an inverse model that modifies the values of the parameters used by the forward model such that a better match is obtained between predictions and observations when the forward model is subsequently reexecuted.

Observations, in the case of stratigraphy, may include, but are not limited to, rock type, texture, fabric, facies tract dimensions, geometry, thickness and symmetry of stratigraphic cycles, inferred paleobathymetry and topography, and petrophysical properties from the three-dimensional rock volume of interest. Observations or data are not restricted to a particular type of observation or a particular tool for observation and measurement. Conventional sources of data include geophysical well logs, seismic data, cores and direct observation of surface outcrops. The observations or data are embodied in a data base that is stored in the memory 24. The observations are used to: (1) make initial guesses for the values of the parameters used by the forward model; and (2) compare with forward model predictions. It should also be noted at this point that the scale of the three-dimensional rock volume and the duration of time it represents are independent of the inversion procedure. Density, numbers, and spacing of the samples (observations) also are independent of the inversion procedure.

The stratigraphic forward model simulates stratigraphy using a set of process parameters (e.g., sea-level change, tectonic movement, sediment supply, compensation to loads, gradients of topographic surfaces, compaction) whose initial values are user-defined. The input values of the processes are manipulated by logic and rules of algorithms which describe the behavior (process-response interactions) of the forward model parameters. The logic and rules derive from an assumed behavior of the stratigraphic process-response system of the natural world. Any stratigraphic forward model can be used in inversion if the model outputs synthetic data (predictions) that can be quantitatively compared with real observations.

The inverse model links the observations and the stratigraphic forward model, i.e., the other two components of the stratigraphic inverse model. The inverse algorithm compares values of forward model predictions with observed values of comparable data. For example, observed thicknesses of a vertical succession of facies tracts in sample wells from the observation set are compared with model predictions of facies tract successions and thickness at the same stratigraphic and geographic positions in the model space. After comparing observed and predicted values, the inverse algorithm simultaneously adjusts values of multiple process parameters such that forward model predictions more closely match observations the next time the forward model is run. The inverse algorithm iteratively compares predicted and observed data, and systematically adjusts values of forward model parameters until differences between predictions and observations are acceptable. In one embodiment, this occurs when the differences are minimized and a best match or a population of equally good matches are achieved. The mathematical inverse algorithm uses magnitudes and signs of differences between predictions and observations, as well as differences in stratigraphic and geographic positions of mismatches to modify values of process parameters. To work efficiently, the inverse algorithm must simultaneously modify values of multiple parameter values by the correct magnitudes and in the correct directions such that the next forward model run will simulate data that are closer to the observed data (i.e., differences between predicted and observed data are reduced). The range of the population of models with equally good matches defines the bounds of uniqueness of the solution. The solution or solutions describe the values of process parameters which originally operated to create the observed stratigraphy. If the population of models contains values for attributes that exist in the real rocks/stratigraphy at the specified location in a rock volume, then the solution is successful.

Figure 3:
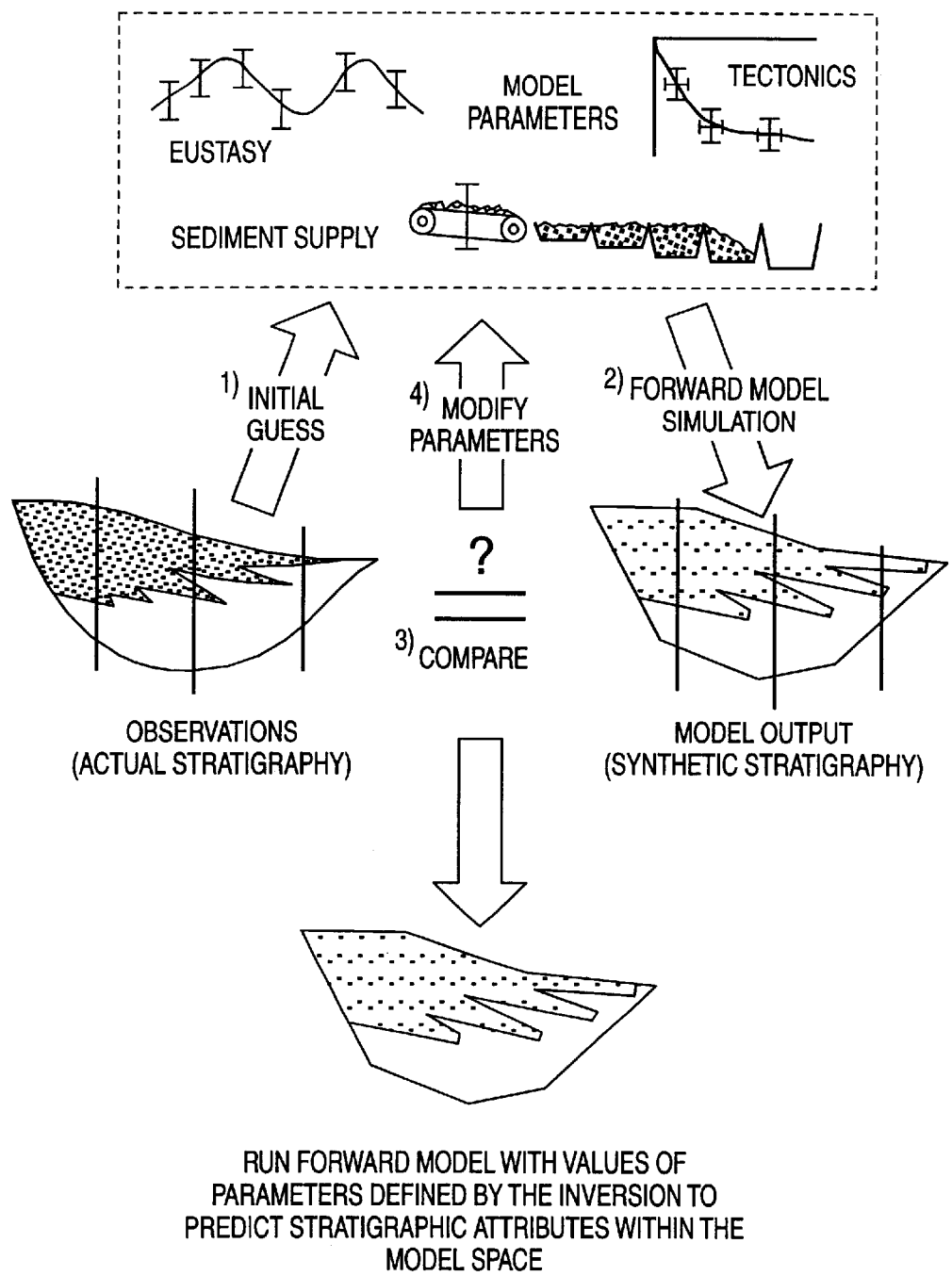
FIG. 3 is a diagram of the steps involved in operating the stratigraphic inverse model shown in FIG. 3.

Having described the basic components of the stratigraphic inverse model, the four basic steps implemented using the components of the inversion model are now described with respect to FIG. 3. Step 1 is done only one time to start the modeling process. The inverse model iterates Steps 2 through 4 until differences between predicted and observed data are acceptably small.

Step 1—Initial guess.

An initial guess for each of the values of forward model parameters is input to the inverse model to begin the calculations. Typically, these initial guesses are input by an operator via the input peripheral 32. The guesses are obtained from stratigraphic observations and knowledge about the basin. The values selected are not particularly important to the operation of the inverse model, because it has been found that the inverse model achieves a good match with observations with any geologically reasonable set of values selected for the initial guess.

Step 2—Forward model simulations.

The inverse model executes the forward model to calculate the stratigraphic responses to the input values of the process parameters, and predict a synthetic stratigraphy.

Step 3—Compare observed and modeled data.

The inverse model calculates differences between the observed data and model predictions.

Step 4—Modify parameter values.

The inverse model uses a mathematical inverse algorithm to modify values of process parameters to reduce the differences between model predictions and observed data until an acceptable match is obtained.

Step 5—Make stratigraphic predictions

Using the parameter values obtained in Step 4, the forward model is run to predict stratigraphy at locations between and beyond the control points. The predicted stratigraphy can then be used either alone or in confirming geological inferences drawn from other data types to identify locations suitable for petroleum or hydrology exploration or exploitation. Drilling or other excavations may then be undertaken at such locations.

Having described the components of the inverse model and the operation of the components in predicting stratigraphy, the characteristics of the observations, stratigraphic forward model and inverse model that have been found to impact the accuracy and precision of the stratigraphic inverse model are now described.

With respect to the observations, the accuracy and precision of the stratigraphic inverse model results depend on the types, amounts, quality, information content and distribution of observed data. To elaborate, observations included in the data base of the stratigraphic inverse model must be qualitatively and quantitatively comparable to the synthetic data output by the forward model. For example, if the forward model simulates grain-size distribution, then texture is an allowable observation. If, on the other hand, the model predicts stratal geometries, but stratal geometries are not known or knowable from stratigraphic data, then the model cannot be used. Similarly, if natural radioactive emission or density can be measured by a well log, but cannot be simulated by the forward model, then the natural radioactive emission or density observations cannot be used.

The types of observations utilized must be also be robust for the stratigraphic inverse model to produce reasonably accurate and precise results. Inversion is possible if the types, quality and quantity of stratigraphic data contain sufficient information with respect to process parameters such that the inverse algorithm can separate the stratigraphic responses due to different parameters and different combinations of parameters. If the types of data contain insufficient amounts and variety of information, then the inverse model cannot separate and determine unique values for the process parameters.

With respect to the robustness of the observations, it has been found that stratigraphic geometries alone do not contain sufficient information with respect to stratigraphic process parameters. Inverting solely on stratigraphic geometries results in nonunique solutions as was discovered by Burton et. al., Out of Our Depth: on the Impossibility of Fathoming Eustasy from the Stratigraphic Record, Earth-Science Reviews, v. 24, p. 237–277, 1987. Among the most robust types of stratigraphic data are the thicknesses and successions of facies tracts with accurate stratigraphic correlation. Cycle symmetries have also been found to be quite robust because they give information about the timing and amount of sediment volume partitioning into different facies tracts.

The observation data must also be correctly collected, measured and interpreted. If forward model predictions match incorrect observations, then the results of the inversion are incorrect even though the calculated errors (mismatches) are low.

With respect to the stratigraphic forward model, the accuracy and precision of the stratigraphic inverse model is impacted by the degree to which the forward model accurately simulates the real world process-response system at a scale appropriate for the particular application and data types available for comparison. If the forward model behaves erratically or lacks findamental constraints (such as conservation of mass, maintenance of reasonable topographic slopes, accurate sediment volume partitioning in stratigraphic cycles and cycle symmetry), then inversion is not possible. As an example, a stratigraphic forward model based on the assumption that rare, haphazard, catastrophic events provided the principal components of the stratigraphic record, then it is unlikely that a stratigraphic inverse model could uniquely match its predictions to the observations. One of the essential implicit assumptions of the stratigraphic inverse model is that causal links exist among stratigraphic responses and combinations of processes and that the responses to different combinations of processes are unique and determinable. Consequently, information obtained in one geographic or stratigraphic position has implications for what happened and what exists elsewhere.

Stratigraphic inverse model results also depend assumptions about the formation of a basin and operation of the stratigraphic process-response system that manifest themselves in the forward model. An important element to successful and accurate stratigraphic prediction through inversion is the use of assumptions about the geologic history of a stratigraphic interval to set up the numbers and combinations of invertable parameters. For example, if there were six findamental changes in values in tectonic movement during the history of deposition, an inverse model would have difficulty obtaining an accurate prediction if the user constrained the tectonic movement parameter to four changes in values. As another example, if sediment supply changes were important and if the user did not invert for sediment supply, the results would be inaccurate.

While not impacting the accuracy or precision of the stratigraphic inverse model, the stratigraphic forward model must be also be computationally fast to be of practical value. This is because the inverse model runs the forward model hundreds of times during a single inverse model run.

The inverse algorithm used in the stratigraphic inverse model has been found to be the least critical with respect to its impact upon the accuracy and precision of the predictions produced by the stratigraphic inverse model. There are numerous inverse models that are available and provide acceptable results, including gradient descent, genetic, synthetic annealing and Monte Carlo. However, it should be noted that some conventional algorithms are extremely inefficient and some will not work with stratigraphic data at all because of the roughness of the prediction-observation minimization surfaces. For example, Monte Carlo and genetic algorithms have a tendency to be inefficient, and the gradient descent algorithms tend to get stuck at local minimum.

One embodiment of the stratigraphic inverse model employs: (1) a two-dimensional forward model that simulates the facies tract distributions, sediment volume partitioning and changes in cycle symmetries that are observed in continental to marine shelf siliclastic strata; and (2) an inversion algorithm developed by Lerche. The two-dimensional forward model is disclosed in Forward and Inverse Simulation Models of Strata Architecture and Facies Distributions in Marine Shelf to Coastal Plain Environments, Ph.D. Dissertation 1993—Colorado School of Mines, Arthur Lakes Library, which is incorporated herein by reference. The Lerche inversion algorithm is disclosed in: Lerche, I., 1992, Oil Exploration Basin Analysis and Economics: Academic Press, 178 p.; Lerche, I., 1996, An Inverse Method for Determining Parameters for Folded Structures: Quarterly of Applied Mathematics, v. 54, p 625–636; and Thomsen, R. O. and Lerche, I., 1997, Relative Contributions to Uncertainties in Reserve Estimates: Marine and Petroleum Geology, v. 14, p. 65–74, which are incorporated by reference.

The Lerche inversion algorithm is robust, yet computationally more efficient than alternative algorithms. Lerche's inversion algorithm is a combination of linear and nonlinear solutions that attempt to reduce the common problem of convergence in local minima and achieve convergence at the global minimum. The first set of iterations use a nonlinear search scheme (Equation 5 below). The nonlinear search is not a gradient-descent algorithm, although it uses gradient descent, nor is it Monte Carlo or Genetic. After conducting a nonlinear search, the inverse model conducts a coarse linear search on every parameter individually. The effect of this procedure is to alternately back away from the data and ensure that the model is heading in the correct direction with respect to a global minimum, then get back close to the data to ensure correct modification of the values of the correct parameters. The following is a description of Lerche's inversion algorithm.

A vector of N parameters is defined, $P_1, P_2, \ldots P_n, \ldots, P_N$ Because different parameters in the inverse model can have large differences in scale, each parameter is normalized to a value between 0 and 1. Minimum and maximum parameter values are defined for each parameter, Pmin and Pmax. The inverse model searches for possible values greater than Pmin and less than Pmax. If the inverse model needs a parameter value outside of these constraints, the model will continually "bump" into the constraining value. For example, if the inverse model would like a value greater than the user-defined Pmax, the model will choose the value of Pmax on multiple inverse model attempts.

A new parameter vector "a" is calculated from the minimum and maximum values:

$$a_n = \frac{(P_n - Pmin)}{(Pmax_n - Pmin_n)} \quad (1)$$

where by definition $$0 \leq a_n \leq 1 \quad (2)$$

This simple transformation has two advantages. First, all parameters have the same scale in the inversion, thereby reducing numerical difficulties. Second, the inversion is constrained within geologically realistic values and the inverse model does not waste time testing parameter values that are geologically unrealistic.

A vector of I observations is defined, $O_1, O_2, \ldots, O_i, \ldots O_I$. For each forward model run, a vector of differences, d, between a vector of observed and modeled data are calculated:

$$d_1 = M_i(x, u, f, a) - O_i(x, u, f) \quad (3)$$

where d, M and O have dimension I. Using these differences, an "objective function", $X^2$, is calculated:

$$X^2(a) = I^{-1} \sum_{i=1}^{I} \left(\frac{1}{C_m^2}\right)(M_i(x, u, f, a) - O_i(x, u, f))^2 \quad (4)$$

where $C_m$ is a measure of uncertainty in either observed or modeled data. In linear algebraic notation, Equation 4 can be written:

$$X^2(a) = d^T C_m^{-1} d$$

The main job of the inverse model is to minimize $X^2$. This is weighted least squares. In a perfect world, the inverse model would determine the values of the parameters ($a_1$, $a_2$, ..., $a_N$) such that modeled data exactly match real data and $X^2$ would be zero. In reality, modeled and real data never exactly match, so values of parameters that minimize the differences are sought. $C_m$ is a matrix with off-diagonal values of zero. Normally, the diagonal values of $C_m$ are 1. However, if a model output or data value is uncertain, setting the diagonal values of $C_m$ to a value between 0 and 1 tells the inverse model how much to trust the corresponding data value. If the inverse algorithm doesn't trust a value very much (i.e. the value is closer to 0 than to 1), the model will put less effort in trying to exactly match that data value.

To start the stratigraphic inverse model, the user gives the model an initial estimate for each parameter. The inverse model then iteratively tries to improve on this estimate. The current nonlinear iteration is k, and there is a total of K nonlinear iterations. Each new parameter estimate at iteration k+1 is based on the previous parameter estimate at iteration k based on a nonlinear iteration scheme:

$$a_n^{(k+1)} = a_n^k \exp\left[-\tanh\left\{\alpha_n \delta_n^k \frac{\partial X^2(a^k)}{\partial a_n^k}\right\}\right] \quad (5)$$

where $$\alpha_n = \left[\frac{\partial X^2(a^0)}{\partial a_n^0}\right]^{-1} \ln\left\{1 + \frac{1}{K a_n^0}\right\} \quad (6)$$

and $$\delta_n^k = \frac{q_n^k}{\left[\frac{1}{N}\sum_{n=1}^{N} q_n^k\right]} \quad (7)$$

where K is the number of nonlinear iterations, and $$q_n^k = \frac{[a_n^k - a_n^{k-1}]}{a_n^k} \quad (8)$$

In Equation 5, each new parameter value depends on the previous parameter value and a mathematical massaging of the value of the gradient of the objective function, $X^2$. The term $$\frac{\partial X^2(a^k)}{\partial a_n^k}$$

is the gradient of $X^2$ at the current parameter estimate $a^k$. This part of the algorithm is similar to a gradient descent inversion scheme. The variable $\alpha_n$ (Equation 6) is a fixed value for each nonlinear iteration and depends on the number of nonlinear iterations K, the initial parameter value, $a_n^0$, and the initial gradient of $X^2$, $$\frac{\partial X^2(a^0)}{\partial a_n^0}.$$

If the initial gradient is low, $\alpha_n$ will be higher and the inverse model will try to change the parameter value more rapidly. Consequently, the inverse model will most rapidly modify parameters that are initially insensitive. The variable $\delta_n^k$ has an opposite effect to $\alpha_n$. $\delta_n^k$ increases as the changes in successive parameter values increase. Consequently, the inverse model will most rapidly modify sensitive parameters. It is the opposing effects of $\alpha_n$ and $\delta_n^k$ that give this inverse algorithm its robustness.

After K iterations of Equation 5, the inverse model steps back and does a coarse linear search. At this time, the inverse model will try several parameter values within the bounds of Pmin and Pmax to see if there is a region in the model space where better matches are possible. This linear search helps get the model out of local minima and allows it to find a global minimum. Although no search scheme can guarantee that a global minimum has been found, this search scheme has been found to be robust in that it rarely gets stuck in local minima, and it recovers correct parameter values with synthetic data.

Although theoretically each and every parameter of the forward model can be inverted simultaneously, limitations in computation speed sometimes require the large number of parameters to be reduced to a manageable few. Presently, the stratigraphic inversion model operates on approximately 10–12 parameters at a time. This generally is not a detriment to accurate inversion for at least two reasons. First, it has been found that the inverse model is sensitive to mixes of fewer parameters, and it becomes less sensitive to mixes of increasing numbers of parameters. Consequently, the inverse model will do a better job of adjusting the values of these parameters to achieve a good match with observations. Second, it is more efficient to invert for sets of parameters. The strategy is to first invert for one set of parameters, e.g., tectonic subsidence, long-term eustasy, initial topography and flexural rigidity. After achieving a good estimate for this set of parameters, we then invert for a new set of parameters, e.g., tectonic subsidence, long-term and short-term eustasy, and sediment supply.

It should be appreciated that the stratigraphic inverse model can use forward models other than the one discussed in the noted dissertation, provided the model outputs data that can be matched to observed data, that the model conserves mass, employs topographic slopes that are within the range of measured values of the appropriate environments and produces sediment volume partitioning and cycle symmetry changes that are observed in stratigraphic sequences. Inverse models other than Lerche's inverse model can also be employed in the stratigraphic inverse model of the present invention. However, as previously, noted some of the other inverse models are either inefficient or subject to getting stuck on a local minima.

Mesa Verde Example

The following is an example of the operation of the stratigraphic inverse model in which the forward model is the one noted in the above referenced dissertation and the inverse model is the Lerche inverse model discussed above.

In the example, stratigraphic inverse model is applied to a stratigraphic data set (observation set) from the Mesa Verde Group (Cretaceous), San Juan Basin, Colo./N. Mex.

Figure 4:
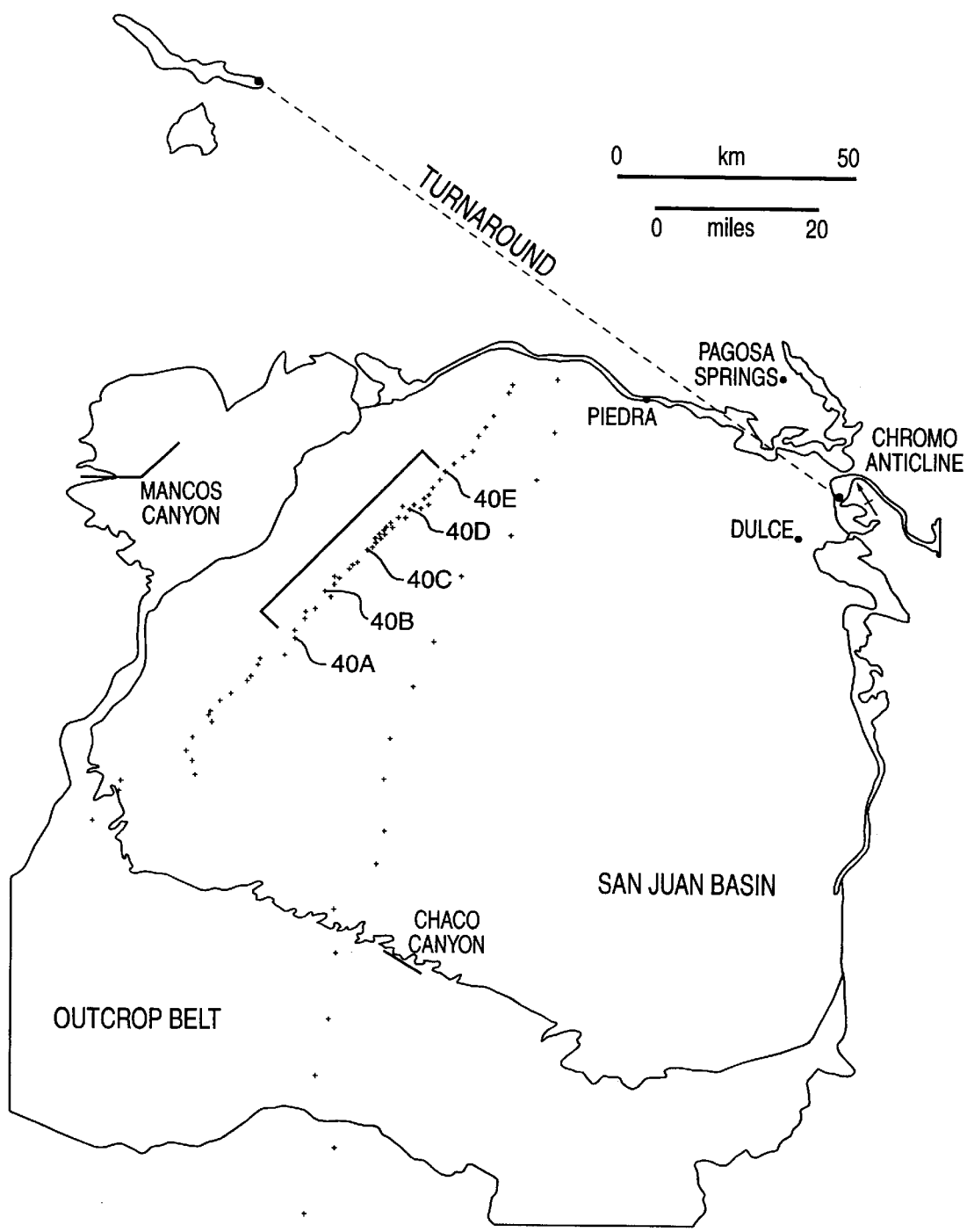
FIG. 4 is a map of the San Juan Basin that shows the location of a series of wells that supplied observation data and data to confirm the accuracy/precision of the results of the stratigraphic inverse model.
Figure 5:
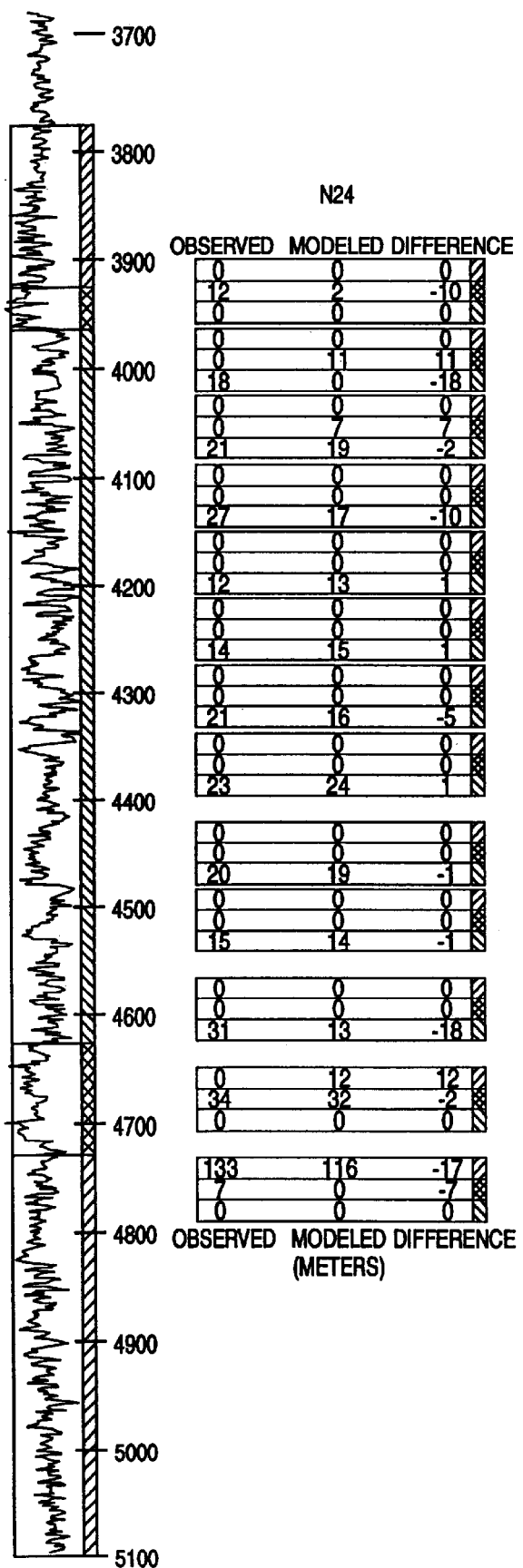
FIG. 5 is an example of the observation data base for one of well logs.

FIG. 4 shows the locations of sixty-two wells located along a dip-parallel cross section in the San Juan Basin, Colo./N. Mex. The logs associated with wells 40A–40E along this cross section provided the observation data used in the stratigraphic inverse model. The stratigraphic observation data used in the stratigraphic inverse model was comprised of facies tract thickness and position for fifteen correlated stratigraphic units in each of the five wells 40A–40E. An example of the data base of the observation data for one of these wells is shown in FIG. 5.

FIG. 6A is a cross section showing the distribution of facies tracts (red=continental; yellow=shoreface; green=shelf) and stratigraphic correlations of the clastic wedge of the Mesa Verde Group, San Juan basin, southwest Colo. and northwest N. Mex. The correlations through most of the cross section were made using wells with quarter-section spacing (1320 feet). Only a few of the wells that were used to make the correlations are shown in FIG. 6A. Included among those that are shown are the wells 40A–40E that supplied the observation data. To summarize, the stratigraphy shown in FIG. 6A is highly accurate and provides a measure against which the accuracy/precision of the results of the stratigraphic inverse model can be judged.

Another measure of the accuracy/precision of the results of the stratigraphic inverse model is provided by the seaward limit of shoreface progradation, and a turnaround from seaward-stepping to landward-stepping stacking patterns. With reference to FIG. 4, the turnaround manifests itself in three outcrops 40A–40C. The corresponding location in FIG. 6A for the turnaround 42 is identified by a red vertical line 46. There is a gap 48 between the right edge of the well coverage and the red vertical line 46. The stratigraphy in the area of the gap 48 is beyond the limit of well control in the basin. In other words the stratigraphy in the area of the gap 68 is uncertain, but the location of the turnaround is known with a high degree of certainty due to the outcrops 40A–40C.

FIG. 6B shows the stratigraphy predicted by the inverse model using the well log data from the five wells 40A–40E. The five wells 40A–40E are indicated by the vertical orange lines in the central part of the cross section. Data input to the inverse model were the thicknesses of each facies tract for each of the correlated units in each well. The inverse model used the data to calculate values of stratigraphic process parameters—such as sea-level change, tectonic movement, sediment supply rates, lithospheric strength, depositional topography-which operated to produce the observed stratigraphy. Once the inverse model obtained a best solution (actually a family of similar best solutions), it then predicted the distribution, volumes and geometries of facies tracts and stratigraphic units for the entire basin (or reservoir, depending on the purpose of the inversion). FIG. 6B is one of these best solutions.

The predicted distribution of facies tracts shown in FIG. 6B has a high degree of correlation with the distribution of facies tracts illustrated in FIG. 6A. For instance, FIG. 6A shows that the shoreface sandstones in the lower half of the Mesa Verde step upward and seaward from the left to right. The stratigraphic inverse model shows the same style of progradation in FIG. 6B. Additionally, FIG. 6A shows the shorefaces of the upper half of the Mesa Verde form 8 to 15 km broad benches which step progressively landward (to the left). The stratigraphic inverse model closely matches the number, position and dimensions of these benches. Further, the depositional limit of the shoreface, or the turnaround position 42 of the clastic wedge was almost exactly predicted exactly by the inverse stratigraphic model, location 50 in FIG. 6B. Location 50 is approximately 50 km from the closest well from which well log data was used, i.e., well 40E. The model recreated the 75 km shift of the shoreface facies tract from the turnaround position to the position of the lowest landward-stepping bench.

One important difference between the model prediction and the well-log cross section is the thickness of the marine shelf strata on the right side of the cross sections. The thinner section predicted by the model is attributed to an algorithm in the model which does not simulate the stratigraphic process-response system quite accurately. Another difference is at the left side of the cross section. The stratigraphic correlations show the shoreface prograding without stratigraphic rise, whereas the model shows shoreface aggradation. In this case, we think the model is more accurate than the geological interpretation, because in this part of the basin, small unconformities within the section were difficult to detect, and it was impossible to find an internal datum which would show the actual geometries of the shoreface progradation.

FIG. 5 shows some of the values of process parameters calculated by the inverse model and used in the forward model shown in FIG. 6B.

What is claimed is:

1. A method for using geological data to predict one or more stratigraphic attributes at a location, the method comprising the steps of:

obtaining real geological data from a location in a sedimentary basin;

providing initial values to a stratigraphic forward model for parameters that are used by said stratigraphic forward model to output a predicted value for a stratigraphic attribute at said location at which said real geological data were obtained, wherein said forward model incorporates a conservation of mass constraint;

using said stratigraphic forward model determine a predicted value for a stratigraphic attribute at said location at which real geological data were obtained based upon values of said parameters;

determining a difference between said predicted value for said stratigraphic attribute and said real geological data at said location;

modifying, if said difference does not satisfy a predetermined criteria, said values of said parameters to reduce said difference between said predicted value of said stratigraphic attribute and said real geological data;

repeating said steps of using, determining and modifying until said difference satisfies said predetermined criteria; and identifying, if said predetermined criteria is satisfied, said predicted value for said stratigraphic attribute as a best prediction for the actual value of the stratigraphic attributes over the space of the stratigraphic forward model.

2. A method for using geological data to predict one or more stratigraphic attributes at a location, the method comprising the steps of:

obtaining real geological data from a location in a sedimentary basin;

providing initial values a stratigraphic forward model for parameters that are used by said stratigraphic forward model to output a predicted value for a stratigraphic attribute at said location at which said real geological data were obtained;

using said stratigraphic forward model to determine a predicted value for a stratigraphic attribute at said location at which real geological data were obtained based upon the values of said parameters, wherein said forward model incorporates one of the following: maintenance of reasonable topographic slopes, accurate sediment volume partitioning in stratigraphic cycles and cycle symmetry, an accurate simulation of the stratigraphic process/response system at the scale of the application;

determining a difference between said predicted value for said stratigraphic attribute and said real geological data at said location;

modifying, if said difference does not satisfy a predetermined criteria, said values of said parameters to reduce said difference between said predicted value of said stratigraphic attribute and said real geological data;

repeating said steps of using, determining and modifying until said difference satisfies said predetermined criteria; and identifying, if said predetermined criteria is satisfied, said predicted value for said stratigraphic attribute as a best prediction for the actual value of the stratigraphic attributes over the space of the stratigraphic forward model.

3. A method for using geological data to predict one or more stratigraphic attributes at a location, the method comprising the steps of:

obtaining real geological data from a location in a sedimentary basin;

providing initial values to a stratigraphic forward model for parameters that are used by said stratigraphic forward model to output a predicted value for a stratigraphic attribute at said location at which said real geological data were obtained;

using said stratigraphic forward model to determine a predicted value for a stratigraphic attribute at said location at which real geological data were obtained based upon the values of said parameters;

determining a difference between said predicted value for said stratigraphic attribute and said real geological data at said location;

modifying, if said difference does not satisfy a predetermined criteria, said values of said parameters to reduce said difference between said predicted value of said stratigraphic attribute and said real geological data, wherein said step of modifying includes using a Lerche inversion algorithm;

repeating said steps of using, determining and modifying until said difference satisfies said predetermined criteria; and identifying, if said predetermined criteria is satisfied, said predicted value for said stratigraphic attribute as a best prediction for the actual value of the stratigraphic attributes over the space of the stratigraphic forward model.

4. A method for using geological data to predict one or more stratigraphic attributes at a location, the method comprising the steps of:

obtaining real geological data from a location in a sedimentary basin;

providing initial values to a stratigraphic forward model for parameters that are used by said stratigraphic forward model to output a predicted value for a stratigraphic attribute at said location at which said real geological data were obtained;

using said stratigraphic forward model to determine a predicted value for a stratigraphic attribute at said location at which real geological data were obtained based upon the values of said parameters;

determining a difference between said predicted value for said stratigraphic attribute and said real geological data at said location;

modifying, if said difference does not satisfy a predetermined criteria, said values of said parameters to reduce said difference between said predicted value of said stratigraphic attribute and said real geological data, wherein said step of modifying includes using a gradient descent inverse algorithm;

repeating said steps of using, determining and modifying until said difference satisfies said predetermined criteria; and identifying, if said predetermined criteria is satisfied, said predicted value for said stratigraphic attribute as a best prediction for the actual value of the stratigraphic attributes over the space of the stratigraphic forward model.

5. A method for using geological data to predict one or more stratigraphic attributes at a location, the method comprising the steps of:

obtaining real geological data containing from a location in a sedimentary basin, wherein said real geological data includes cycle symmetries;

providing initial values to a stratigraphic forward model for parameters that are used by said stratigraphic forward model to output a predicted value for a stratigraphic attribute at said location at which said real geological data were obtained;

using said stratigraphic forward model to determine a predicted value for a stratigraphic attribute at said location at which real geological data were obtained based upon the values of said parameters;

determining a difference between said predicted value for said stratigraphic attribute and said real geological data at said location;

modifying, if said difference does not satisfy a predetermined criteria, said values of said parameters to reduce said difference between said predicted value of said stratigraphic attribute and said real geological data by;

repeating said steps of using, determining and modifying until said difference satisfies said predetermined criteria; and identifying, if said predetermined criteria is satisfied, said predicted value for said stratigraphic attribute as a best prediction for the actual value of the stratigraphic attributes over the space of the stratigraphic forward model.

* * * * *